Patented Oct. 7, 1947

2,428,752

UNITED STATES PATENT OFFICE 2,428,752

PROCESS FOR PRODUCING UREA-FORMALDEHYDE RESINS

Philip Stanley Hewett, Royal Oak, Mich., assignor to Reichhold Chemicals, Inc., Detroit, Mich.

No Drawing. Application October 27, 1944, Serial No. 560,710

6 Claims. (Cl. 260—69)

1

The invention relates to improvements in urea type resins and the process of preparing the same. More particularly the invention relates to a urea-formaldehyde resin having novel properties and uses, such resin being produced from urea and formaldehyde with the aid of a suitable buffer. Among the many uses of the improved resin may be mentioned the following:

(1) When used in the preparation or treatment of paper the said resin imparts to the product a remarkable degree of wet strength.

(2) On account of its homogeneity and rapid conversion, as well as its stability, the said resins are particularly useful in the textile field, wherein they impart a marked degree of abrasion resistance and dimensional stability to the materials so treated.

(3) The novel resin is found to possess an unusual capacity for adhesion to glass, a characteristic in which previously known urea formaldehyde resins have been notoriously weak. Thus the improved resin is applicable for use in the glass wool and fiber glass field.

I have discovered that these new and valuable condensation products can be prepared by the condensation of urea and formaldehyde under controlled conditions of pH, produced by using a borax boric acid buffer in conjunction with a polyhydric alcohol. The clear, water-soluble, stable condensation products thus produced possess numerous advantages over similar condensation products prepared by usual procedures. These products are prepared between the molar ratios of formaldehyde to urea of 2.0–1 and 2.5–1. They are perhaps best characterized by the ease with which they are selectively absorbed on the surface of cellulosic materials such as paper pulp and cotton. In these applications they are of particular interest as they impart unusual and desirable properties to the cellulosic materials so treated. Resins prepared by this method also differ from the normally produced condensation products of urea and formaldehyde in that they possess a most unusual adhesion to glass surfaces.

For purpose of explanation the preparation of the resin may be conveniently divided into two steps. In the first step the reactants are in a medium which is sufficiently alkaline so that they condense to form the methylol compound almost exclusively. This pH is obtained by the use of a borax boric acid buffer. These two catalysts should be present in such ratio that the pH of the reaction mixture falls between 6.7 and 7.3 for most efficient condensation. The total amount

2 of boric acid plus borax, added as initial condensation catalyst, should range between 0.3% and 1.0% of the weight of the formaldehyde used. The optimum amount of catalyst using commercially available formaldehyde of normal acidity will be found to be approximately 0.5%. Formaldehyde containing more formic acid will obviously take more, and formaldehyde containing less acid will require correspondingly less catalyst.

In the second step, that of controlled condensation, the pH gradually decreases due to the ratio of buffers selected, thus inducing a controlled condensation of the methylol groups formed during the initial reaction with the formation of a condensate through the methylene and/or ether linkage. This gradual decrease in pH tends to produce condensates of a uniform molecular size. In order to decrease time of the condensation by increasing the rate of reaction I have found it expedient to alter the composition of the buffer. This may be conveniently accomplished by the addition of from 1.0 to 2.5% additional boric acid based on the total weight of materials in the reactor. The change in catalyst ratio increases the pH gradient and allows the condensation to proceed at a correspondingly more rapid rate.

In order to further hasten this condensation I have found that the addition of a polyhydric alcohol such as glycerols, polyglycerol, ethylene glycol, diethylene glycol, mannitol, sorbitol, etc., is very advantageous. These polyhydric alcohols react with the boric acid with the formation of a complex thus increasing the concentration of hydrogen ion available at a controlled rate. This polyhydric alcohol is normally used in catalytic amounts in the neighborhood of 2–3%. Larger amounts may be used during the condensation, or added later, and if added in sufficient quantity will function as plasticizers.

The condensation is completed by removing some of the water present by distillation at atmospheric pressure. This treatment increases the molecular weight by removing one of the products of reaction, water, while at the same time allowing the pH to remain substantially unchanged. This latter result is obtained because the removal of water apparently suppresses the ionization and the available hydrogen ion concentration is thus reduced at such a rate that it compensates for the increase in concentration.

The resin thus prepared is then diluted by the addition of sufficient water to bring it to the desired solids content. The pH of the solution should then be adjusted to a value above 7.0 to prevent undue advancement of the resin in the container during storage and prior to use.

A resin manufactured according to the process herein disclosed may be characterized by the titration curve obtained when a dilute water solution of this resin is titrated with a solution of an acid salt or a dilute solution of a suitable acid. This curve, if plotted with the ml. of acid or salt solution added as abscissa, and the pH as ordinate on rectangular coordinates falls into a reproducible pattern.

The first few ml. of acid or salt solution added induce very little change in the pH. Subsequent small additions cause a very rapid decrease in the pH which is evidenced by a marked change in slope. Further small additions decrease the pH rapidly, and the graph becomes a straight line for a short distance. Further additions produce another marked change in slope and the curve flattens out almost parallel to the abscissa and approaches asymptotically the limiting value determined by the concentration and type of acid or acid salt used.

For a given concentration of resin in water the relative position of the curve on the graph can be shifted from the right to the left by altering the catalyst ratio. The position of the curve can be raised or lowered by choice of the acid or acid salt used in titration, but the general contour of the curve remains the same.

Resins prepared according to the process outlined above and possessing the properties described, can be advantageously employed to treat cellulosic material such as paper in a manner such as to alter certain of its characteristics. This resin may, for example, be added to the beater and preferentially adsorbed on the fibers by the addition of a suitable acidic catalyst. The alum normally employed by paper manufacturers has been found to be satisfactory. This resinated paper pulp, when treated in the normal way, formed into a sheet and dried, gives paper possessing a remarkable degree of wet strength. The introduction of 3% of this novel resin into the beater will give sheets having a wet mullen of 30 to 50% of the dry mullen. More or less resin may be deposited in the sheet depending upon specifications to be met, economics, etc. with the production of sheets having a gradient of properties. These resins may be used in the preparation of waterleaf sheets, or to equal advantage, in the preparation of a sized sheet suitable for printing.

The application of these resins, as herein described, to paper is not limited to the beater. Similar results may be obtained by introduction of the resin into the head box, or if preferred, they may be introduced at the size press at a point where the paper web is partially dried. The heat applied in drying the paper should be enough to give the resin its initial set. It is not necessary, however, to completely convert the resin as it will continue to convert upon standing in the roll, in some instances complete conversion taking place only after seven to fourteen days.

The addition of this resin to the beater has a further and unique advantage in that it enables the paper manufacturer to form a sheet containing relatively large quantities of clay extender. The resin in this case not only aids in the retention of the clay, but also imparts a degree of wet strength to the sheet so filled. These sheets as prepared have advantages over the normally prepared filled sheets in that they can be prepared so as to have the same folding endurance, elmendorf and mullen test as sheets containing no filler.

These resins may also be used to prepare new and useful paper coating compositions. In combination with clay, titinox or color, starch and accelerator they can be made into free flowing slips. The coating thus prepared applied in the usual manner and hot calendered produces high grade paper suitable for printing. If a hot calender is not available, heat curing followed by calendering will produce a nicely finished sheet. Coating compositions prepared using this resin possess a great advantage over those prepared using starch alone in that they give a coating that possesses a degree of water resistance.

In the textile field these resins find application as they import a marked degree of abrasion resistance and dimensional stability to materials so treated. In this application they produce a marked advantage over the simple condensate dimethylol urea. This resin, though it has a relatively low molecular weight, does have a resinous nature. It can be easily visualized that such a resin would give a different product when caused to react with the free hydroxyl groups of a cellulose unit than would the simple primary condensate dimethylol urea.

The following examples will serve to illustrate the process of preparing the resins described above:

*Example 1*

| | Grams |
|---|---|
| Formaldehyde (37% soln.) | 810 |
| Borax | 2 |
| Boric acid | 2.5 |
| Urea | 260 |

The formaldehyde was weighed out into a three-necked, three liter flask equipped with mechanical agitation and provided with a reflux condenser. The weighed catalysts were then added and allowed to enter completely into solution before the weighed urea was added. After the addition of the urea, heat was applied and the temperature of the cook was increased to 100° C. in 45 minutes. The temperature was maintained at refluxing for 15 minutes, at the end of which time 14 g. of boric acid were added to the cook. The material was held at refluxing for 1 hour, and 45 g. of glycerine were added. The refluxing was continued for one more hour, then the apparatus was changed in such a manner as to allow the removal of distillate.

Distillation under atmospheric pressure was continued until 310 g. of distillate had been removed. 160 g. of water were weighed out and added to adjust the solids of the resin contained in the flask. A sufficient quantity of 10% caustic was added to adjust the pH to a value of 7.11.

A total of 971 g. of clear resin were obtained having the following constants:

| | |
|---|---|
| Per cent non-volatile | 49.1 |
| Viscosity (G.-H.) | E |
| pH | 7.11 |
| Water solubility | Infinite |
| Color | Less 1L |

*Example 2*

This resin was prepared in a manner identical to that described in Example 1 in all respects, with the exception that 45 g. of ethylene glycol were used in place of the 45 g. of glycerol employed above.

This resin produced in this manner had the following constants:

| | |
|---|---|
| Per cent non-volatile | 50.4 |
| Viscosity (G.-H.) | B |
| pH | 7.20 |
| Water solubility | Infinite |
| Color | Less 1L |

The improved urea-formaldehyde condensation product produced in accordance with the present invention is found to possess a remarkable adhesion to glass surfaces and is suitable for use as a prime coat for glass fiber and glass cloth when applied prior to impregnation with suitable laminating resins, thereby increasing their adhesion to such glass surfaces.

I claim:

1. A process for producing a clear water soluble stable resin by heat reacting urea and 37% aqueous formaldehyde in the molar ratio of 1 part urea to 2-2.5 parts of formaldehyde, in a two-step process, the first step being carried out at a pH of 6.7 to 7.3 in the presence of a buffer consisting of a mixture of borax and boric acid, the amount of buffer employed being 0.3-1.0% by weight based on the quantity of aqueous formaldehyde, and in the second step adding from 1-2.5% by weight of boric acid based on the total weight of materials undergoing treatment.

2. A process for producing a clear water soluble stable resin by heat reacting urea and 37% aqueous formaldehyde in the molar ratio of 1 part urea to 2-2.5 parts of formaldehyde, in a two-step process, the first step being carried out at a pH of 6.7 to 7.3 in the presence of a buffer consisting of a mixture of borax and boric acid, the amount of buffer employed being 0.3-1.0% by weight based on the quantity of aqueous formaldehyde, and in the second step adding from 1-2.5% by weight of boric acid based on the total weight of materials undergoing treatment and a polyhydric alcohol selected from a group consisting of glycerol, polyglycerol, ethylene glycol, diethylene glycol, mannitol and sorbitol.

3. A process for producing a clear water soluble stable resin by heat reacting urea and 37% aqueous formaldehyde in the molar ratio of 1 part urea to 2-2.5 parts of formaldehyde, in a two-step process, the first step being carried out at a pH of 6.7 to 7.3 in the presence of a buffer consisting of a mixture of borax and boric acid, the amount of buffer employed being 0.3-1.0% by weight based on the quantity of aqueous formaldehyde being reacted, and in the second step adding from 1-2.5% by weight of boric acid based on the total weight of materials undergoing treatment and glycerine.

4. A process for producing a clear water soluble urea formaldehyde resin, which comprises first heating urea and 37% aqueous formaldehyde in the proportions of 1 part of urea to 2-2.5 parts of formaldehyde in the presence of a buffer consisting of a mixture of borax and boric acid, the amount of buffer employed being in the proportion of 0.3-1.0% based on the weight of the aqueous formaldehyde, while maintaining a pH of 6.7-7.3, then adding additional boric acid in the proportion of from 1-2.5% based on the total weight of materials undergoing treatment, and completing the reaction by removing at least part of the water present by distillation at atmospheric pressure.

5. A process for producing a clear water soluble urea formaldehyde resin, which comprises first heating urea and 37% aqueous formaldehyde in the proportions of 1 part of urea to 2-2.5 parts of formaldehyde in the presence of a buffer consisting of a mixture of borax and boric acid, the amount of buffer employed being in the proportion of 0.3-1.0% based on the weight of the aqueous formaldehyde, while maintaining a pH of 6.7-7.3, then adding additional boric acid in the proportion of from 1-2.5% based on the total weight of materials undergoing treatment, and completing the reaction by removing at least part of the water present by distillation at atmospheric pressure, then adjusting the pH to above 7 to prevent undue advancement of the resin.

6. A process for producing a clear stable water soluble urea formaldehyde resin comprising forming a reaction mixture having a pH of 6.7 to 7.3, said reaction mixture comprising urea and 37% aqueous formaldehyde in the molar proportion of 1 part of urea to 2-2.5 parts of formaldehyde, in the presence of a buffer consisting of a mixture of borax and boric acid, the amount of the buffer employed being .3 to 1% by weight based on the quantity of aqueous formaldehyde, then applying heat and increasing the temperature of the cook to 100° in 45 minutes, maintaining the temperature at refluxing for 15 minutes, then adding from 1-2.5% by weight of boric acid based on the total weight of materials undergoing treatment, and completing the condensation by removing a part at least of the water present by distillation at atmospheric pressure.

PHILIP STANLEY HEWETT.

REFERENCES CITED

The following references are of record in the file of this patent:

UNITED STATES PATENTS

| Number | Name | Date |
|---|---|---|
| 1,952,598 | Luther et al. | Mar. 27, 1934 |
| 2,034,479 | MacDonough | Mar. 17, 1935 |
| 2,341,009 | Axelrad | Feb. 8, 1944 |
| 1,687,312 | Ripper | Oct. 9, 1928 |
| 1,920,451 | Knilling | Aug. 1, 1933 |